US010055797B2

(12) United States Patent
Kunapuli et al.

(10) Patent No.: US 10,055,797 B2
(45) Date of Patent: Aug. 21, 2018

(54) SYSTEM AND METHOD FOR INDEXING APPLICATION PROGRAMMING INTERFACES (APIS)

(71) Applicants: Sreenivas Kunapuli, Hyderabad (IN); Sateesh Theetha, Bangalore (IN)

(72) Inventors: Sreenivas Kunapuli, Hyderabad (IN); Sateesh Theetha, Bangalore (IN)

(73) Assignee: Wipro Limited, Bangalore (IN)

( * ) Notice: Subject to any disclaimer, the term of this patent is extended or adjusted under 35 U.S.C. 154(b) by 554 days.

(21) Appl. No.: 14/746,053

(22) Filed: Jun. 22, 2015

(65) Prior Publication Data
US 2016/0247238 A1 Aug. 25, 2016

(30) Foreign Application Priority Data
Feb. 19, 2015 (IN) .............................. 808/CHE/2015

(51) Int. Cl.
*G06Q 40/00* (2012.01)
*H04W 4/70* (2018.01)
*H04W 4/00* (2018.01)

(52) U.S. Cl.
CPC ............. *G06Q 40/12* (2013.12); *H04W 4/005* (2013.01); *H04W 4/70* (2018.02)

(58) Field of Classification Search
CPC ........................................................ G06F 17/30
USPC ........................................................... 705/30
See application file for complete search history.

(56) References Cited

U.S. PATENT DOCUMENTS

| 2013/0067061 | A1 | 3/2013 | Khalid et al. |
| 2014/0101255 | A1 | 4/2014 | Pal et al. |
| 2014/0310249 | A1* | 10/2014 | Kowalski .......... G06F 17/30289 707/688 |
| 2015/0337862 | A1 | 11/2015 | Rao |

* cited by examiner

*Primary Examiner* — Russell S Glass
(74) *Attorney, Agent, or Firm* — Finnegan, Henderson, Farabow, Garrett & Dunner, LLP (57) ABSTRACT

This disclosure relates generally to application programming interfaces, and more particularly to system and method for indexing APIs. In one embodiment, a processor-implemented application programming interface economy indexing method is disclosed. The method may include identifying, via one or more hardware processors, an application programming interface associated with at least one device in Internet of Things operatively connected to a communication network. The method may also include receiving a request to access the application programming interface. The method may further include determining a monetary category for the application programming interface, based on the request. Also, the method may include calculating an economy index for the application programming interface. The method may include determining, using the monetary category, one or more financial conditions of access to the application programming interface.

21 Claims, 4 Drawing Sheets

SYSTEM AND METHOD FOR INDEXING APPLICATION PROGRAMMING INTERFACES (APIS)

PRIORITY CLAIM

This U.S. patent application claims priority under 35 U.S.C. § 119 to: India Application No. 808/CHE/2015, filed on Feb. 19, 2015. The aforementioned application is incorporated herein by reference in its entirety.

TECHNICAL FIELD

This disclosure relates generally to application programming interfaces (APIs), and more particularly to a system and method for indexing APIs.

BACKGROUND

An API is a collection of routines and/or protocols for building software applications that may be organized in libraries. An API allows software components to receive input, provide output, and facilitate operations. Further, an API may define functionalities. For example, a social media network may have an API that allows third party applications to query social media entries, receive results, and publish users' posts.

Hardware products may have their own API. For example, a hard drive may have its own API that defines available functions, such as writing and reading bits or addressing memory. Other products may have different APIs. Theses APIs may be updated to add additional functionality to existing products.

SUMMARY

In one embodiment, a non-transitory computer-readable medium storing computer-executable application programming interface economy indexing instructions is disclosed. The instructions may include identifying, via one or more hardware processors, an application programming interface associated with at least one device in Internet Of Things operatively connected to a communication network. The instructions may also include receiving a request to access the application programming interface. The instructions may also include determining a monetary category for the application programming interface, based on the request. The instructions may also include calculating an economy index for the application programming interface. The instructions may include determining, using the monetary category, one or more financial conditions of access to the application programming interface. The instructions may further include determining, using the economy index, whether the one or more financial conditions of access to the application programming interface are satisfied. The instructions may include controlling access to the application programming interface, based on determining whether the one or more financial conditions of access to the application programming interface are satisfied.

In an embodiment a processor-implemented application programming interface economy indexing method is disclosed. The method may include identifying, via one or more hardware processors, an application programming interface associated with at least one device in Internet Of Things operatively connected to a communication network. The method may include receiving a request to access the application programming interface. The method may include determining a monetary category for the application programming interface, based on the request. The method may include calculating an economy index for the application programming interface. The method may further include determining, using the monetary category, one or more financial conditions of access to the application programming interface. The method may include determining, using the economy index, whether the one or more financial conditions of access to the application programming interface are satisfied. Additionally, the method may include controlling access to the application programming interface, based on determining whether the one or more financial conditions of access to the application programming interface are satisfied.

In an additional embodiment, systems are disclosed to perform the method.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Users own more computerized devices today than ever before. While the advent of smartphones and tablets has spurred device growth, the inclusion of computer mechanisms in traditional appliances and devices may further growth. For example, manufacturers of washing machines, refrigerators, padlocks, watches, and automobiles are adding additional functionality by incorporating computer processing equipment in their products. The concept where computing can occur using any device, at any location, and in any format is referred to as ubiquitous computing. However, device connectivity is necessary to make the most of computerized devices. For example, as software is being run on any device, business processes increase efficiency when accessed through interfaces across organizations, partners and customers. APIs provide the functionality to expose business and domestic processes and facilitate device interaction in a ubiquitous computing environment. For example, APIs connect various devices, such as new devices produced as part of the "Internet of Things" (IoT).

IoT devices may interact with enterprise services. For example, IoT devices may need to send data to an enterprise server (e.g. appliance service requests, healthcare monitor alerts) or obtain data from an enterprise (e.g., refrigerator shopping list app querying for prices or listed foods). APIs form the interfaces of communication between ubiquitous devices. When devices send data into an enterprise server or retrieving data from an enterprise server, APIs are used. An API is a toolset of protocols and routines specifying how one application can interact with another. For example, an API may define the type of price queries that a grocery store service may answer. The number of devices and services, such as IoT devices, that can be connected via APIs, far exceed the number of mobile phones and tablets. Thus, it may be beneficial to organize these APIs.

By 2020, 90% of cars are expected to feature built-in connectivity, up from just 10% today with an estimated 210 million connected cars hitting the road over the next few years. This is transforming the relationship between car owners and manufacturers beyond the driving experience. Examples of APIs for a connected car include roadside assistance, concierge services, crash notification, vehicle remote services, pay-per-drive rental, road condition awareness, parking space availability, data for insurance providers, and improved fleet management. Projections indicate that half of business-to-business collaboration will take place through Web APIs by 2017, and by next year 75% of Fortune 1000 firms will offer public Web APIs. Hence, the number of APIs used will only continue to grow.

APIs may change over time. For example, an enterprise service may alter the requests it may field. Additionally, an enterprise service may choose to charge for API usage. Hence, organizations creating and publishing APIs may benefit from monitoring activity to determine the effects of API changes. For example, an enterprise service may measure and analyze the effects of pricing changes, such as after the implementation of dynamic pricing.

An API may have several modes of publishing. An API may be published for free or charged per use. Though there is direct monetary income produced from an API that is published for free, the nature of the usage of the API is relevant to the organization that is publishing the API. For example, when a developer pays for an API, he or she may pay for additional API services on top of free APIs.

Further, the payment structures for APIs vary widely. For example, an enterprise service could offer an API as a "pay as you go" model, a unit based pricing depending on the consumption of the API, a tiered pricing mechanism, or a flat transaction fee applied to access the API, for example. Also, some organizations prefer to pay their developers to influence change on these APIs. For example, some APIs may use a revenue sharing model. Costs may be associated with every click or user action. Additionally, referral based pricing may be used, where pricing is dictated by the number of additional users that the implementer of an API may cause to use the API. APIs may also be indirectly used, such as for content acquisition or syndication. APIs may be priced on a software-as-a-service (SaaS) based model. Pricing may also be based on whether a feature of an API is internal-facing or consumer-facing. Further, pricing of APIs can also differ based on where a developer accesses an API, such as from a mobile device versus a workstation.

To optimize API usage and manage varying pricing arrangements, organizations may use tracking software to determine, for example: an optimal pricing model for the different APIs required and used in an organization; an optimal usage of the APIs based on the requirements of the different APIs for the organization. Organizations may also use disclosed systems to measure the usage of the different APIs enabled in the organization at various stages during the lifecycle of the APIs.

Disclosed embodiments may create and maintain an index that may determine the degree of digitization for organizations, partners, and customers to effectively engage and collaborate in the IoT era. This index may be referred to as an "API Economy Index" (AEI). The AEI may be defined to address a core need for users of a particular device via an API. The AEI may enable close monitoring of the APIs and model effects of proposed changes in API structuring. For example, the AEI may be used to determine whether a change may increase or decrease usage or revenue of a particular API. The AEI may also allow enterprises to direct future development efforts to target observed or projected needs. Because APIs are dynamic, the AEI may update regularly to reflect changes. For example, dynamic pricing, changing modes, and changing stakeholders may be accounted for in an AEI that is regularly updated.

Illustrative embodiments of the present disclosure are listed below. In one embodiment, an example system for creating and maintaining an AEI is disclosed. The system may monitor API usage to determine index values for known APIs. In an embodiment, an example process for creating and maintaining an AEI is disclosed. The disclosed systems and process may be implemented together, however this is not required. Other systems and devices may be used to perform disclosed methods. Further, disclosed systems and devices may be used to perform additional methods not described in the disclosed processes.

Figure 1:
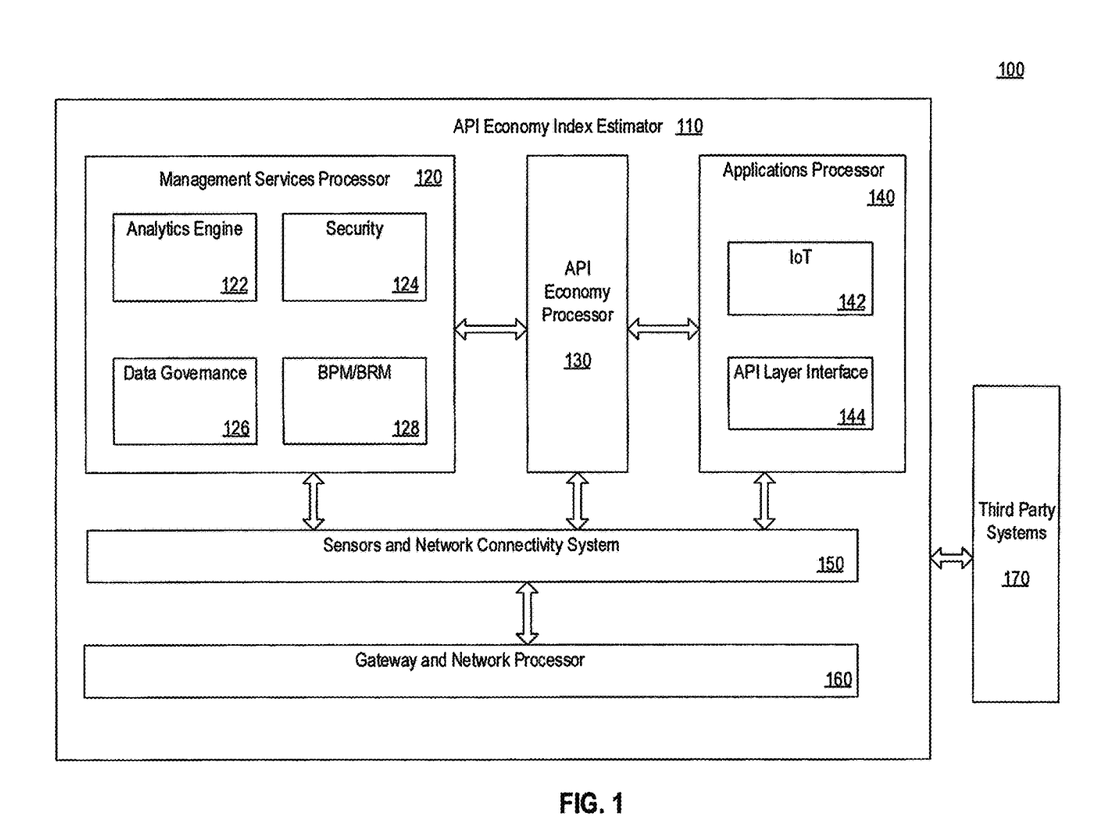
FIG. 1 illustrates an exemplary API indexing system according to some embodiments of the present disclosure.

FIG. 1 illustrates an exemplary API indexing system according to some embodiments of the present disclosure. System 100 may include AEI estimator 110, which may be made of various processors or modules. The depicted functional blocks may be implemented using one or more hardware processors, such as application specific integrated circuits (ASICs). In other embodiments, the functional blocks may include hardware performing processes based on instructions. In other embodiments, the functional blocks may perform processes using software or virtualized hardware.

As depicted, AEI estimator 110 may include management services processor 120, API economy processor 130, applications processor 140, sensors and network connectivity system 150, and gateway and network processor 160. AEI estimator 110 may include additional functional blocks, such as a central database (not depicted).

Applications processor 140 may monitor applications, such as application API interactions. A wide range of applications from different industry sectors may leverage IoT devices. Applications may be vertically integrated, such as applications that may be specific to a particular industry sector. Other applications, such as Fleet Management, Asset Tracking, and Surveillance may cut across multiple industry sectors. An API Layer may be implemented in these applications to allow the applications to interact with external systems. APIs may allow applications to use customizations that increase the functionality of the underlying applications.

Applications processor 140 may include API layer interface 144 and IoT interface 142 to monitor applications.

API layer interface 144 may transfer requests from applications to an IoT Layer. For example, a request may pass on information from another connected device on the IoT or request information from a network of IoT devices.

IoT interface 142 may allow applications processor 140 to interact with IoT devices using, for example, an IoT layer. The IoT may include a massive numbers of devices that may sense, communicate, and share information. IoT devices may interconnect using public or private Internet Protocol (IP) networks. Devices' data may be collected, analyzed, and utilized using the network. For example, a system may use device data to initiate action or organize management and decision making. Example IoT devices may include everyday objects, such as vehicles and personal electronics, as well as non-traditional devices, such as food and clothing. Examples of subjects of networked "things" may include people, locations (e.g., of objects), time (e.g., of objects), and conditions (e.g., of objects). These "things" may be integrated into the computing systems using emerging IoT devices.

IoT interface 142 may monitor IoT device activity. For example, when a "thing" (e.g., an IoT device) is connected to the Internet, IoT devices may consume information coming from the API Layer and may attempt to process such information. For example, IoT interface 142 may monitor requests to the Management Service Layer. IoT interface 142 may interact with API interface 144 to provide relevant information that an API layer has requested.

API economy processor 130 may gather information regarding APIs. In an embodiment, API economy processor 130 may enable close monitoring of the APIs and calculate a model for API usage. For example, API economy processor 130 may develop a financial model based on the expense and revenue of an API. Models of API economy processor 130 may determine sustainability of the API over time. In certain embodiments, the model may be a standardized process performed by API economy processor 130 for every API that is written and monitored over time.

In an embodiment, API economy processor 130 may act as a sticky layer. For example, API economy processor may monitor every transaction that happens from the API Layer (e.g., as determined by API layer interface 144) to the IoT Layer (e.g., as determined by IoT interface 142) and vice versa. API economy processor may ensure that the API that is being executed is authorized for execution. For example, API economy processor 130 may verify whether a price is associated with the API and that the price is paid before execution.

In an embodiment, API economy processor 130 may collect intelligence on the usability of the API and volume metrics based on the execution of the API. For example, API economy processor 130 may determine a number of clicks, a number of users accessing the API, a time taken for execution, revenue generated in a specified time period, and a holiday season variance of API usage. API economy processor 130 may communicate the collected intelligence. For example, API economy processor 130 may transmit execution time and holiday season variance information for analytics processing in management services processor 120. Other processors, such as management services processor 120 may store API intelligence and volume metrics. API Economy processor 130 may monitor sensor activity to determine response intervals and response latency from sensors, such as sensor and network connectivity system 150. The information gathered by API economy processor 130 may be used to value and index an API.

In an embodiment, management services processor 120 may process metrics based on information (e.g., metrics received from API economy processor 130). Management services processor 120 may utilize analytics, security controls, process modelling and device management to provide AEI information.

Management services processor 120 may include business process manager and business rules manager (BPM/BRM) 128. In an embodiment, BPM/BRM 128 may include a business rule engine and a process rule engine. For example, IoT interface 142 may receive information regarding objects and systems in the form of events or contextual data (e.g., the temperature of goods, current locations, and traffic data). Some events may require filtering or routing to post-processing systems. Other events or contextual data may require an immediate response based on the particular situation. For example, some situations may include reacting to emergencies on patient's health conditions. BPM/BRM 128 may utilize rules engines to support the formulation of decision logics and trigger interactive and automated processes to enable a more responsive IoT system.

Analytics engine 122 may be included in management services processor 120. Analytics engine 122 may analyze capture data. In an embodiment, Analytics engine 122 may use various analytics tools to extract relevant information from massive amounts of raw data. These tools may allow analytics engine 122 to process the data at a much faster rate. Example analytics tools may include in-memory analytics that allows large volumes of data to be cached in random access memory (RAM), rather than stored in physical disks. In-memory analytics may reduce data query time and augment the speed of decision making by analytics engine 122. Analytics engine 122 may also implement streaming analytics where the analysis of data that is considered data-in-motion is carried out in real time. Streaming analytics may allow decisions to be made in a matter of seconds. For example, in the transportation sector, real-time traffic information may be processed by analytics engine 122 to allow drivers to use more efficient routes, resulting in decreased travelling times. Analytics engine 122 may operate on other layers within the IoT architecture. For example, analytics engine 122 may utilize the smart object layer (e.g., a local hub or edge device) so that subsets of the information may be carried through the network for further processing. At the smart object layer, analytics may help to reduce the stress placed on the network layer. This arrangement may reduce power needs of sensors because less frequent communication will occur on the backend, which may allow faster responses to data received by the sensors.

Data governance 126 may govern the flow of data in AEI estimator 110. In an embodiment, data governance 126 may operate on the management service layer, allowing information to be accessed, integrated, and controlled. Higher layer applications may be shielded from the need to process unnecessary data, which may reduce the risk of privacy disclosure including the source of the data. In an embodiment, data governance 126 may use techniques to hide the details of the information while providing only essential information that is usable for the relevant applications. For example, data governance 126 may apply data filtering techniques, such as data anonymization, data integration, and data synchronization. These techniques may allow data governance 126 to implement data abstraction, allowing information to be extracted to provide a common business view of data to gain greater agility and utility across domains.

Security 124 may implement protocols to ensure system integrity. In an embodiment, Security 124 may enforce security standards across the every dimension of the IoT architecture from the smart object layer to the application layer. As additional devices rely on additional data for critical processes, security is of the utmost importance as the integrity of the data must be protected as data travels across system 100. The integrity of data may enable reliable and authentic decisions to be made using AEI estimator 110. Moreover, security of the system prevents system hacking by unauthorized personnel, thus reducing the possibility of risks associated with a compromised system.

AEI estimator 110 may include sensors and network connectivity system 150. Sensors and network connectivity system 150 may interact with a layer made up of smart objects integrated with sensors. The sensors may enable interconnectivity between the physical spaces and digital environments by allowing real-time information to be collected and processed. For example, as hardware is further miniaturized, powerful sensors may be produced in much smaller forms which are integrated into objects in the physical world.

Sensors and network connectivity system 150 may include various types of sensors for different purposes. In an embodiment, sensors may have the capacity to take measurements such as temperature, air quality, movement and electricity. In some examples, sensors may include memory that enables the sensors to record a number of measurements. A sensor may measure the physical property and convert it into signal that can be understood by an instrument, such as a digital code. Sensors may be grouped according to their purpose. Example groups may include environmental sensors, body sensors, home appliance sensors, and vehicle telematics sensors, for example.

In an embodiment, sensors may require connectivity to sensor aggregators (e.g., gateway and network processor 160). Connectivity may be obtained using a Local Area Network (LAN), including Ethernet and Wi-Fi connections. In other examples, a Personal Area Network (PAN) may be used, including ZigBee, Bluetooth, and Ultra-Wideband (UWB) connections, for example. Some sensors may not require connectivity to sensor aggregators. These sensors may connect directly to backend servers or applications using a Wide Area Network (WAN), such as GSM, GPRS and LTE. Sensors that use low power and low data rate connectivity may form wireless sensor networks (WSNs). WSNs may accommodate increased numbers of sensor nodes while retaining adequate battery life and covering large areas.

AEI Estimator 110 may include gateway and network processor 160. In an embodiment, gateway and network processor 160 may process networked sensor data. An increased volume of data may be produced by the sensors of Sensors and Network Connectivity System 150. Gateway and network processor 160 may provide a robust and high performance wired or wireless network infrastructure as a transport medium. Current networks may utilize different protocols. Gateway and network processor 160 may utilize machine-to-machine (M2M) networks and their applications to traverse disparate protocols.

System 100 may be arranged for connecting with third party systems 170. This connection may allow system 100 to serve a wider range of IoT services and applications. As previously discussed, access protocols are needed to interact in a heterogeneous configuration. Networks may be formed from private, public or hybrid models and built to support the communication requirements for latency, bandwidth or security.

A possible deployment of system 100 may include a converged network infrastructure that may resolve fragmentation by integrating disparate networks into a single network platform. Converged network layer abstraction may allow multiple organizations to share and use the same network independently for their information to be routed without compromising their privacy, security, and performance requirements. Each system may utilize the network as their own private resource.

API Indexing Method

Figure 2:
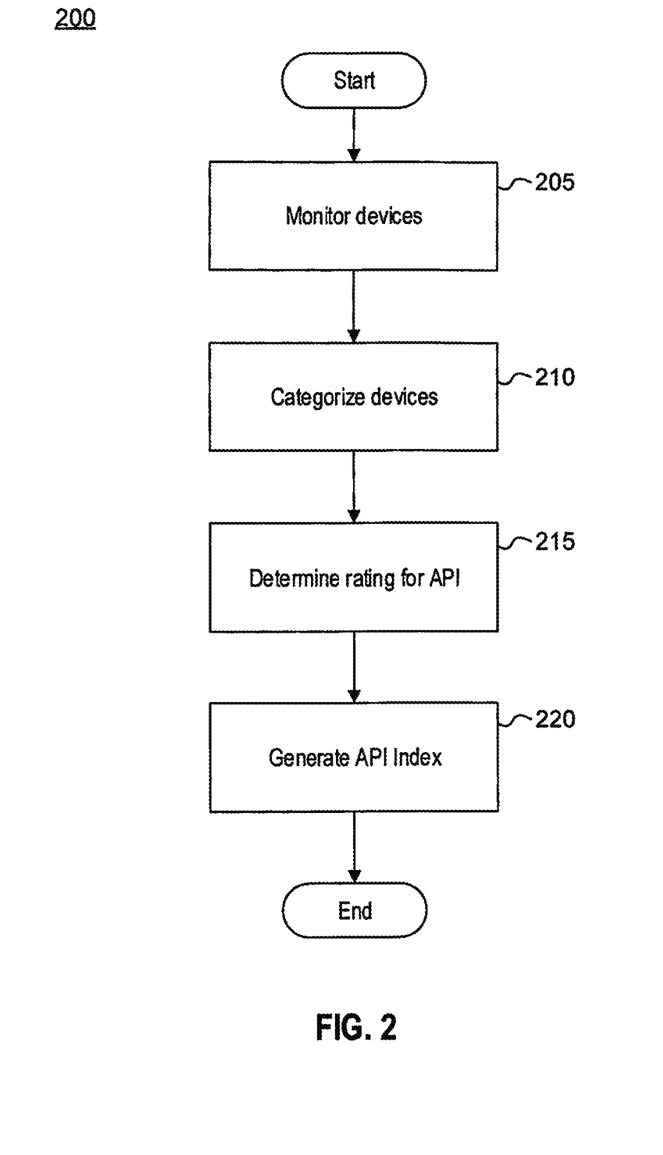
FIG. 2 is a flow diagram illustrating an API indexing process in accordance with some embodiments of the present disclosure.

FIG. 2 is a flow diagram illustrating an API indexing process in accordance with some embodiments of the present disclosure. The steps of process 200 may be performed in the disclosed order. In other embodiments, certain steps may be reordered to omitted.

In step 205, system 100 may monitor IoT devices. In an embodiment, applications processor 140 may identify activity from processors, sensors, and touchscreens. These "things" (e.g., electronic devices, vehicles, and equipment) may get associated with the AEI estimator 110 through the tags and/or sensors in the sensors and network connectivity system 150. Sensors and network connectivity system 150 may assign IoT devices an IP address (e.g., in the IPv6 scheme) to enable the IoT device to connect to the Internet (e.g., through a LAN or PAN).

Internet-connected IoT devices may have functionality to execute. The 'functionality' may include a wide range of processes including knowing the quantity of milk in a refrigerator or trying to identify location co-ordinates of a chair in a hospital. This functionality resides in an IoT layer processed by IoT interface 142 of Applications Processor 140. An API is written on top of these functionalities for IoT devices.

Figure 3:
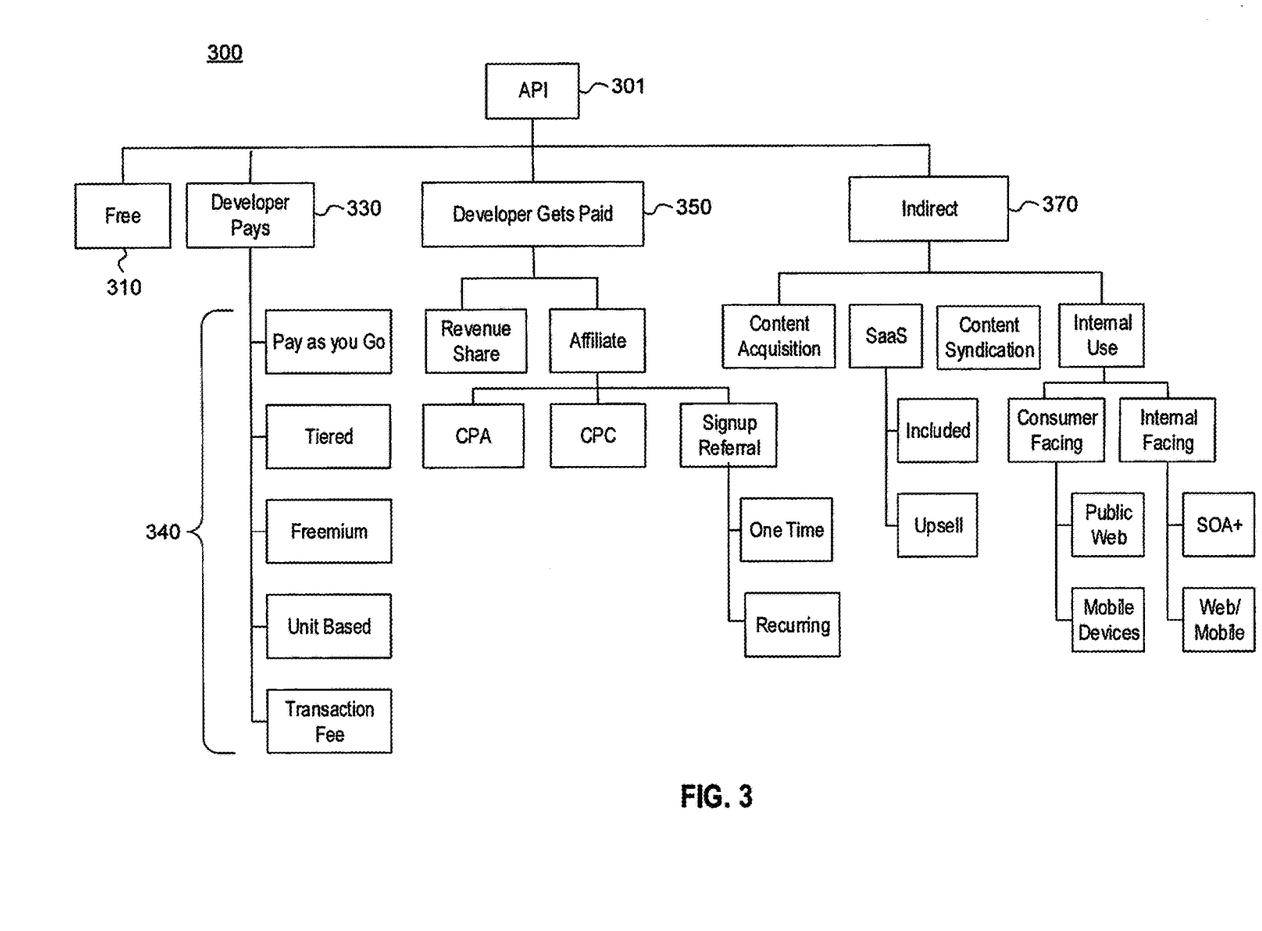
FIG. 3 illustrates an example API classification scheme in accordance with some embodiments of the present disclosure.

Also in step 205, API economy processor 130 may monitor if an IoT device has been enabled on the Internet using $T_e$ where, $T_e$ is an index to measure whether an IoT device is enabled or disabled on the Internet. For example, if, $T_e$=0—this indicates that a device is not enabled for IoT
$T_e$=1—this indicates that a device is enabled for IoT
Thus, $T_e$ indicates the period of enablement during the longevity/lifecycle of the API with relation to the time of usage In step 210, AEI estimator 110 may categorize IoT devices into different classifications. For example, APIs may fall under several categories. BPM/BRM 128 may include pre-written rules that may enable an IoT device or API to fall under a certain category. BPM/BRM 128 may have its own layer that may enable categorization of these things on IoT. FIG. 3 provides an example representation of how APIs may be cateborized.

FIG. 3 illustrates an example API classification scheme 300 in accordance with some embodiments of the present disclosure. For example, an API may be typically be categorized into four classes: (1) free API class 310; (2) developer-paid API class 330; (3) developer-compensated API class 350; and (4) indirect payment API class 370. Each of these classes may include additional subclasses, such as subclass 340 as shown in FIG. 3.

Example free APIs may include APIs that do not have any monetary value. These APIs may not cost anything; however, they may also not generate any revenue.

Example developer-paid APIs may include APIs where the developer pays for access. These may be APIs that have monetary value. A developer may pay for the API when the developer has to customize something on the API or reuse the API for a different purpose.

Example developer-compensated APIs may include APIs where a developer gets paid for working on the API. For example, these may be APIs that have monetary value. A developer may get paid for working on the API if the source organization owning the API has a need to do so.

Indirect APIs may include APIs that are not of direct use. However, these APIs may need to be measured to generate a complete index.

Security 124 may implement a security layer to ensure that appropriate authorization is enabled for the API to execute a certain function. For example, an API may be categorized as a "pay per use." A person with a account for accessing only "free" APIs should not be able to execute a "pay per use" API. The security layer may ensure appropriate restriction of execution of the API depending on the user privileges.

Returning to FIG. 2, in step 215 AEI estimator 110 may determine the value of various classes of APIs. In an embodiment, AEI estimator 110 may determine the value of every monitored API. For example, system 100 could use an industry specific questionnaire to field API users' opinions and usage. The questionnaire could reside on a brand's social networking page or on an intranet portal where APIs are being used. The questionnaire may probe key usage parameters and business value dimensions that govern the APIs between a brand and its community of users. The inter-relationship and strength of these business value dimensions determine how engaged the community is with the brand through a particular API, and may define the business value that drives an API's affinity and usage. Each of the APIs in the classification scheme may be scored.

In step 215, AEI estimator 110 may determine a rating for each API. For example, the key questionnaires on APIs have a set of parameters and sub-parameters, each of the parameters associated with a questionnaire may be on multiple topics. Example topics may include:

API Score: This score may measure influence based on an API's ability to drive action, this is more of the design factor in the API which will enable it to better filter the data from sensors and/or ecosystems and derive key actionable insights.

Time Factor: The score may calculate usage of API's for a period of time and check if the usage and effectiveness increases over period of time. This score may also determine the usage and success of APIs API Reach: This score may calculate the true reach and the overall amplification and network score reflecting how well the eco-system may use an API and the usage of the API during amplified or business-critical times.

API Propagation Factor: This score may indicate how the current API can drive the usage of other APIs. By driving other APIs the particular API may further the business value, giving the API a higher score.

Peer Impact Score: This score may identify the usability and extensibility of APIs to maintain a competitive score and keep high business values.

Spam Score: While there is a business value associated for each API, certain APIs may create more data and increase processing costs, rather than add value to the ecosystem. This score may be formatted so that a lower score indicates a better business value for the API economy.

The above parameters form the eco-system for the determination of value of a particular set of IoT devices or APIs. The score may reflect the business value at a given point in time. The business economy value for APIs may continually change. Hence, the scores may keep changing and the system and method indicated here may calculate values on a continuous basis.

Overall API Score may be determined using a weighted sum calculation. For example, parameters for scoring may be $x_0, x_1, x_2, \ldots x_M$, and the respective weightage of these categories may be $w_0, w_1, w_2, \ldots w_M$, where M is the number of parameters. Each of the main parameters may have sub-parameters, for $x_0$ may be depicted as $x_{00}, x_{01}, x_{02}, \ldots x_{0N}$ and, assuming weightage of each of these is depicted as $w_{00}, w_{01}, w_{02}, \ldots w_{0N}$, where N is the number of subparameters for a particular parameter. Overall value for each of the business APIs may be determined as:

$$x_0 = x_{00}*w_{00} + x_{01}*w_{01} + \ldots x_{0N}*w_{0N}$$

Overall Score may be determined as:

$$\text{Overall Score} = x_0*w_0 + x_1*w_1 + \ldots x_M*w_M$$

The Overall Value ($T_V$) may be a variance measure of the overall score of the parameters and the weightage for each of the APIs in each of the individual baskets is determined as follows:

$$T_V = (x_{00}*w_{00} + x_{01}*w_{01} + x_{0N}*w_{0N})*w_0 + (x_{10}*w_{10} + x_{11}*w_{11} + \ldots x_{1N}*w_{1N})*w_1 + \ldots x_M*w_M$$

Determining the business value of a particular set of IoT devices or APIs may be accomplished by totaling the individual scores for each item. For example, a complete value may be defined by summating all the overall values of the individual devices or APIs. Hence, Overall Business Value ($T_{BV}$) may be calculated as follows:

$$T_{BV} = \Sigma(T_V) \text{ for each of the categorized things}$$

In step 220, AEI estimator 110 may determine an index based on the business values calculated in step 215. In an embodiment, an AEI may be generated as a direct measure of the longevity of the API with relation to the time ($T_e$) and business value variance ($T_{BV}$) incurred by an API over the time. The AEI may be based on the overall business value of a fixed set of APIs or IoT devices and services bought by a typical consumer, relative to a value of the same set in some base year (e.g., year-over-year activity). By including a broad range of devices and services within a fixed category, an AEI may obtain an accurate estimate of the value of a particular API. An AEI may not be a particular dollar value. However, an AEI value may be an index number or a percentage change from the base year. On a regular basis (e.g., monthly), AEI estimator 110 may publish an updated AEI. For example, AEI estimator 110 may calculate values using the following formulae:

$$\text{AEI for time period } 1 = 100*(T_e*T_{BV})_1/(T_e*T_{BV})_1$$

$$\text{AEI for time period } 2 = 100*(T_e*T_{BV})_2/(T_e*T_{BV})_1$$

$$\text{AEI for time period } 3 = 100*(T_e*T_{BV})_3/(T_e*T_{BV})_1$$

Hence, an AEI for any time period n may be calculated as:

$$\text{AEI} = 100*(T_e*T_{BV})_n/(T_e*T_{BV})_1$$

Process 200 may repeat to update an AEI as necessary. Particular steps may be repeated or omitted when updates are performed. For example, classifications may not need to be repeated when new usage data is received.

Computer System

Figure 4:
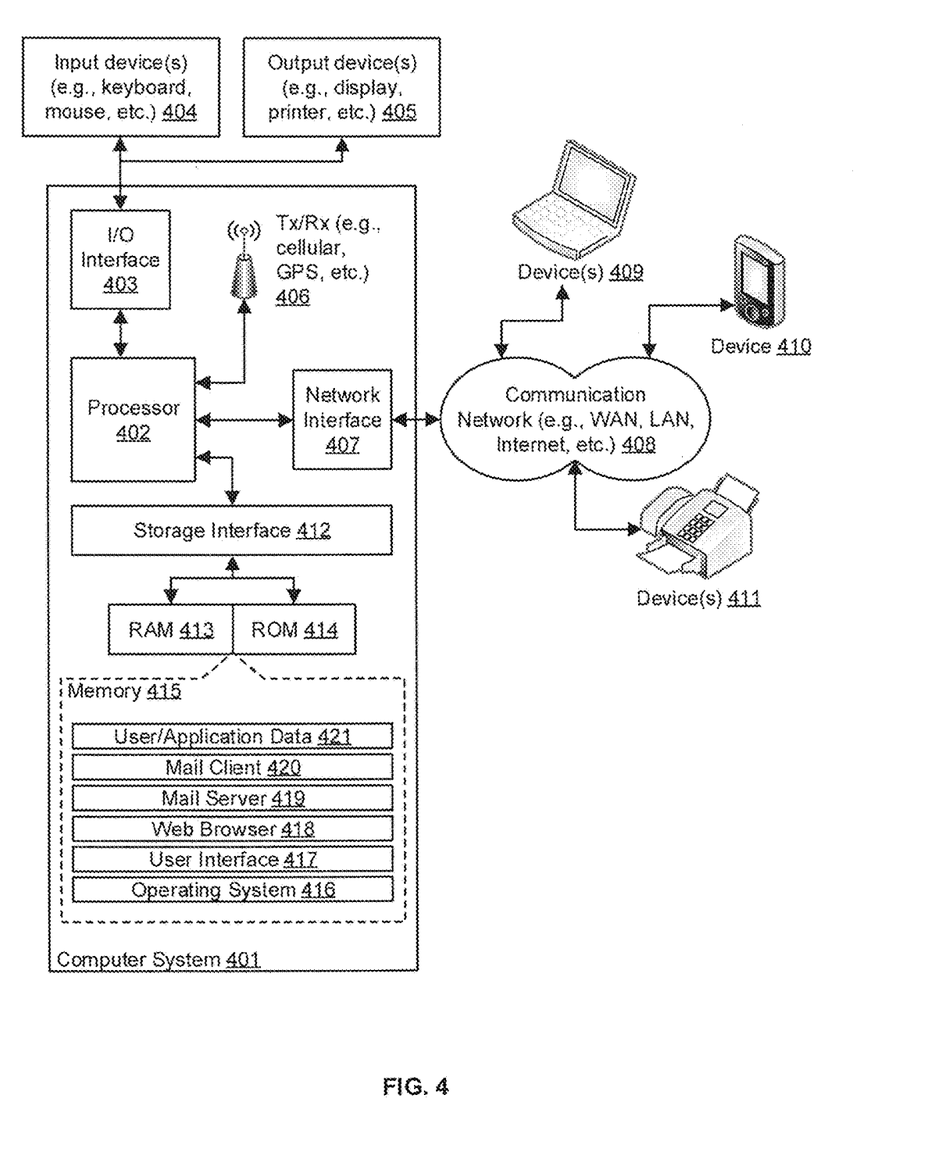
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for implementing management services processor 120, API economy processor 130, applications processor 140, sensors and network connectivity system 150, gateway and network processor 160, and third party systems 170. Computer system 401 may comprise a central processing unit ("CPU" or "processor") 402. Processor 402 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, data governance 126, BPM/BRM 128, and third party systems 170.

The memory devices may store a collection of program or database components, including, without limitation, an operating system 416, user interface 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. (e.g., AEI index values, questionnaire results, usage statistics, etc.) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described system and method for indexing APIs. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented application programming interface economy indexing method, comprising:
   identifying, via one or more hardware processors, an application programming interface associated with at least one device operatively connected to a communication network, the at least one device including one or more sensors;
   receiving a request to access the application programming interface;
   determining a monetary category for the application programming interface, based on the request;
   calculating an economy index for the application programming interface;
   determining, using the monetary category, one or more financial conditions of access to the application programming interface;
   determining, using the economy index, whether the one or more financial conditions of access to the application programming interface are satisfied; and
   controlling access to the application programming interface, based on determining whether the one or more financial conditions of access to the application programming interface are satisfied by, at least in part, changing a power level or on/off status of the at least one device that is connected to the communication network and includes the one or more sensors.

2. The method of claim 1, wherein the monetary category is one of: free; payment receivable; payment payable; or indirect.

3. The method of claim 1, wherein calculating the economy index for the application programming interface comprises:
   determining parameters including: an application programming interface design score, a time usage factor, an application programming interface use score, an application programming interface propagation factor, a peer impact score, and a spam score;
   wherein each of the determined parameters comprises one or more sub-parameters;
   calculating overall parameter scores for each of the determined parameters as weighted sums of the associated sub-parameters;
   calculating an overall application programming interface score as a weighted sum of the overall parameter scores;
   calculating a business value of the at least one device, using the overall application programming interface score, as a summation across all monetary categories for the application programming interface; and
   calculating the economy index for the application programming interface using the calculated business value of the at least one device.

4. The method of claim 1, wherein at least one of the financial conditions of access to the application programming interface comprises whether a price, determined using the economy index, has been paid.

5. The method of claim 1, wherein controlling access to the application programming interface comprises:
   granting the request to access the application programming interface after determining that the price has been paid; and
   denying the request to access the application programming interface after determining that the price has not been paid.

6. The method of claim 1, further comprising:
   aggregating data on one or more of: application programming interface usability, application programming interface usage, application programming interface call execution time, application programming interface-related revenue; and
   analyzing the aggregated data to generate one or more analytic results; and
   modifying an operation of the at least one device operatively connected to the communication network based on the one or more analytic results.

7. The method of claim 6, wherein modifying the operation of the at least one device operatively connected to the communication network comprises: modifying a configuration parameter of one of the one or more sensors associated with the at least one device operatively connected to the communication network; and wherein the configuration parameter comprises at least one of: a reporting frequency, a communication bandwidth, or a response time.

8. An application programming interface indexing system comprising:
   one or more hardware processors; and
   a computer-readable medium storing instructions that, when executed by the one or more hardware processors, cause the one or more hardware processors to perform operations comprising:
   identifying, via one or more hardware processors, an application programming interface associated with at least one device operatively connected to a communication network, the at least one device including one or more sensors;
   receiving a request to access the application programming interface;
   determining a monetary category for the application programming interface, based on the request;
   calculating an economy index for the application programming interface;
   determining, using the monetary category, one or more financial conditions of access to the application programming interface;
   determining, using the economy index, whether the one or more financial conditions of access to the application programming interface are satisfied; and
   controlling access to the application programming interface, based on determining whether the one or more financial conditions of access to the application programming interface are satisfied by, at least in part, changing a power level or on/off status of the at least one device that is connected to the communication network and includes the one or more sensors.

9. The system of claim 8, wherein the monetary category is one of: free; payment receivable; payment payable; or indirect.

10. The system of claim 8, wherein calculating the economy index for the application programming interface comprises:
    determining parameters including: an application programming interface design score, a time usage factor, an application programming interface use score, an application programming interface propagation factor, a peer impact score, and a spam score;
    wherein each of the determined parameters comprises one or more sub-parameters;
    calculating overall parameter scores for each of the determined parameters as weighted sums of the associated sub-parameters;
    calculating an overall application programming interface score as a weighted sum of the overall parameter scores;
    calculating a business value of the at least one device, using the overall application programming interface score, as a summation across all monetary categories for the application programming interface; and
    calculating the economy index for the application programming interface using the calculated business value of the at least one device.

11. The system of claim 8, wherein at least one of the financial conditions of access to the application programming interface comprises whether a price, determined using the economy index, has been paid.

12. The system of claim 8, wherein controlling access to the application programming interface comprises:
    granting the request to access the application programming interface after determining that the price has been paid; and
    denying the request to access the application programming interface after determining that the price has not been paid.

13. The system of claim 8, the operations further comprising:
    aggregating data on one or more of: application programming interface usability, application programming interface usage, application programming interface call execution time, application programming interface-related revenue; and
    analyzing the aggregated data to generate one or more analytic results; and
    modifying an operation of the at least one device operatively connected to the communication network based on the one or more analytic results.

14. The system of claim 13, wherein modifying the operation of the at least one device operatively connected to the communication network comprises: modifying a configuration parameter of one of the one or more sensors associated with the at least one device operatively connected to the communication network; and wherein the configuration parameter comprises at least one of: a reporting frequency, a communication bandwidth, or a response time.

15. A non-transitory computer-readable medium storing computer-executable application programming interface economy indexing instructions for:
    identifying, via one or more hardware processors, an application programming interface associated with at least one device operatively connected to a communication network, the device including one or more sensors;
    receiving a request to access the application programming interface;
    determining a monetary category for the application programming interface, based on the request;

calculating an economy index for the application programming interface;

determining, using the monetary category, one or more financial conditions of access to the application programming interface;

determining, using the economy index, whether the one or more financial conditions of access to the application programming interface are satisfied; and controlling access to the application programming interface, based on determining whether the one or more financial conditions of access to the application programming interface are satisfied by, at least in part, changing a power level or on/off status of the at least one device that is connected to the communication network and includes the one or more sensors.

16. The medium of claim 15, wherein the monetary category is one of: free; payment receivable; payment payable; or indirect.

17. The medium of claim 15, wherein calculating the economy index for the application programming interface comprises:

determining parameters including: an application programming interface design score, a time usage factor, an application programming interface use score, an application programming interface propagation factor, a peer impact score, and a spam score;

wherein each of the determined parameters comprises one or more sub-parameters;

calculating overall parameter scores for each of the determined parameters as weighted sums of the associated sub-parameters;

calculating an overall application programming interface score as a weighted sum of the overall parameter scores;

calculating a business value of the at least one device, using the overall application programming interface score, as a summation across all monetary categories for the application programming interface; and calculating the economy index for the application programming interface using the calculated business value of the at least one device.

18. The medium of claim 15, wherein at least one of the financial conditions of access to the application programming interface comprises whether a price, determined using the economy index, has been paid.

19. The medium of claim 15, wherein controlling access to the application programming interface comprises:

granting the request to access the application programming interface after determining that the price has been paid; and denying the request to access the application programming interface after determining that the price has not been paid.

20. The medium of claim 15, further storing instructions for:

aggregating data on one or more of: application programming interface usability, application programming interface usage, application programming interface call execution time, application programming interface-related revenue; and analyzing the aggregated data to generate one or more analytic results; and modifying an operation of the at least one device operatively connected to the communication network based on the one or more analytic results.

21. The medium of claim 20, wherein modifying the operation of the at least one device operatively connected to the communication network comprises modifying a configuration parameter of one of the one or more sensors associated with the at least one device operatively connected to the communication network; and wherein the configuration parameter comprises at least one of: a reporting frequency, a communication bandwidth, or a response time.

* * * * *